US012600921B2

(12) United States Patent
Anderson et al.

(10) Patent No.: US 12,600,921 B2
(45) Date of Patent: Apr. 14, 2026

(54) NO RINSE QUAT/ACID/ETHOXYLATED ALCOHOL DISINFECTANT COMPOSITION FOR FOOD CONTACT SURFACES

(71) Applicant: ECOLAB USA INC., Saint Paul, MN (US)

(72) Inventors: Derrick Anderson, Saint Paul, MN (US); Kelly Anne Rightmire, Saint Paul, MN (US); Erik C. Olson, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 567 days.

(21) Appl. No.: 18/051,245

(22) Filed: Oct. 31, 2022

(65) Prior Publication Data

US 2023/0138385 A1 May 4, 2023

Related U.S. Application Data

(60) Provisional application No. 63/263,293, filed on Oct. 29, 2021.

(51) Int. Cl.

*C11D 1/835* (2006.01)
*C11D 1/04* (2006.01)
*C11D 1/08* (2006.01)
*C11D 1/62* (2006.01)
*C11D 3/10* (2006.01)
*C11D 3/12* (2006.01)

(52) U.S. Cl.

CPC .................. *C11D 1/62* (2013.01); *C11D 1/04* (2013.01); *C11D 1/08* (2013.01); *C11D 3/10* (2013.01); *C11D 3/122* (2013.01)

(58) Field of Classification Search

CPC .... C11D 1/62; C11D 1/04; C11D 1/08; C11D 3/10; C11D 3/122; C11D 1/72; C11D 1/835; C11D 3/042; C11D 3/48; C11D 2111/14

See application file for complete search history.

(56) References Cited

U.S. PATENT DOCUMENTS 4,320,147 A 3/1982 Schaeufele
5,000,867 A 3/1991 Heinhuis-Walther et al.
5,336,500 A 8/1994 Richter et al.
5,389,685 A 2/1995 Smith et al.
5,436,008 A 7/1995 Richter et al.
5,545,749 A 8/1996 Smith et al.
5,547,990 A 8/1996 Hall et al.
5,833,741 A 11/1998 Walker
6,464,764 B1 10/2002 Lichtenberg et al.
6,583,181 B1 6/2003 Chiang et al.
6,632,291 B2 10/2003 Rabon et al.
6,667,289 B2 12/2003 Harrison et al.
6,693,070 B1 2/2004 Cheung et al.
6,867,233 B2 3/2005 Roselle et al.
6,939,840 B2 9/2005 Lichtenberg et al.
6,964,787 B2 11/2005 Swart et al.
7,838,447 B2 11/2010 Clark et al.
7,915,207 B2 3/2011 Herdt et al.
8,221,733 B2 7/2012 Lichtenberg et al.
8,586,115 B2 11/2013 Burwell et al.
10,045,529 B2 8/2018 Griese et al.
10,154,950 B2 12/2018 Bobbert
10,206,392 B2 2/2019 Kloeppel et al.
10,285,400 B2 5/2019 Lei et al.
10,358,623 B1 7/2019 Mitchell et al.
10,426,162 B2 10/2019 Man et al.
10,568,321 B2 2/2020 Bentley et al.
10,834,922 B2 11/2020 Lan et al.
10,844,322 B2 11/2020 Ryther et al.
11,406,103 B2 8/2022 Man et al.
2002/0061366 A1 5/2002 Walker et al.
2003/0029812 A1 2/2003 Burns et al.
2003/0114342 A1 6/2003 Hall
2003/0187073 A1 10/2003 Lichtenberg et al.
2004/0220275 A1 11/2004 Lutzeler et al.
2005/0124723 A1 6/2005 Fritschi et al.
2006/0128585 A1 6/2006 Adair et al.
2009/0197786 A1* 8/2009 Perry .................... C11D 3/225 510/191
2010/0055196 A1 3/2010 MacGregor
2012/0157540 A1 6/2012 McGeechan et al.
2012/0213759 A1* 8/2012 Karsten .................... C11D 1/62 424/94.1
2014/0171512 A1 6/2014 Kloeppel et al.
2016/0295859 A1 10/2016 Chan et al.
2017/0251663 A1* 9/2017 Man ...................... A01N 25/30
2017/0284605 A1 10/2017 Janak et al.
2018/0087009 A1 3/2018 Man et al.

(Continued)

FOREIGN PATENT DOCUMENTS

EP 1634942 A1 3/2006
GB 2187097 A 9/1987

(Continued)

OTHER PUBLICATIONS

International Search Report and Written Opinion in PCT/US2022/048411, mailed Feb. 24, 2023, 12 pages.

(Continued)

*Primary Examiner* — Charles I Boyer
(74) *Attorney, Agent, or Firm* — McKee, Voorhees & Sease, PLC

(57) ABSTRACT

No rinse, low pH food contact disinfecting and sanitizing compositions comprising one or more quaternary ammonium compounds in combination with an acid source are provided. The compositions include antimicrobial quaternary ammonium compounds such as alkyl dimethyl benzyl ammonium chlorides (ADBAC), alkyl dimethyl ethyl benzyl ammonium chlorides (ADEBAC), dialkyl dimethyl ammonium chlorides (DAAC), or a combination thereof together with an organic acid. The disinfecting and sanitizing compositions and methods of using the same provide enhanced microbial kill at an acidic pH and even at very low concentrations of the antimicrobial quaternary ammonium compound.

15 Claims, 1 Drawing Sheet

(56) References Cited

U.S. PATENT DOCUMENTS

| | | | | |
|---|---|---|---|---|
| 2018/0110220 | A1 | 4/2018 | Anderson et al. | |
| 2018/0249706 | A1 | 9/2018 | Anderson et al. | |
| 2020/0229435 | A1 | 7/2020 | Malet et al. | |
| 2020/0253203 | A1* | 8/2020 | Sehgal ................. | C11D 3/2075 |
| 2020/0305437 | A1 | 10/2020 | McGeechan et al. | |
| 2020/0337304 | A1 | 10/2020 | Nitin et al. | |
| 2021/0337792 | A1 | 11/2021 | Anderson et al. | |
| 2021/0340464 | A1 | 11/2021 | Anderson et al. | |

FOREIGN PATENT DOCUMENTS

| | | | | | |
|---|---|---|---|---|---|
| WO | 0035283 | A1 | | 6/2000 | |
| WO | 0063337 | A1 | | 10/2000 | |
| WO | 2006136771 | A1 | | 12/2006 | |
| WO | 2008049616 | A1 | | 5/2008 | |
| WO | 2022040135 | A1 | | 2/2022 | |
| WO | 2022104031 | | † | 5/2022 | |
| WO | WO-2022104031 | A2 | * | 5/2022 | ............. A01N 25/02 |

OTHER PUBLICATIONS

Yeater et al., "Effectiveness of Sanitizing Products on Controlling Selected Pathogen Surrogates on Retail Deli Slicers," Journal of Food Protection, 2015, vol. 78, No. 4, pp. 707-715.

* cited by examiner
† cited by third party

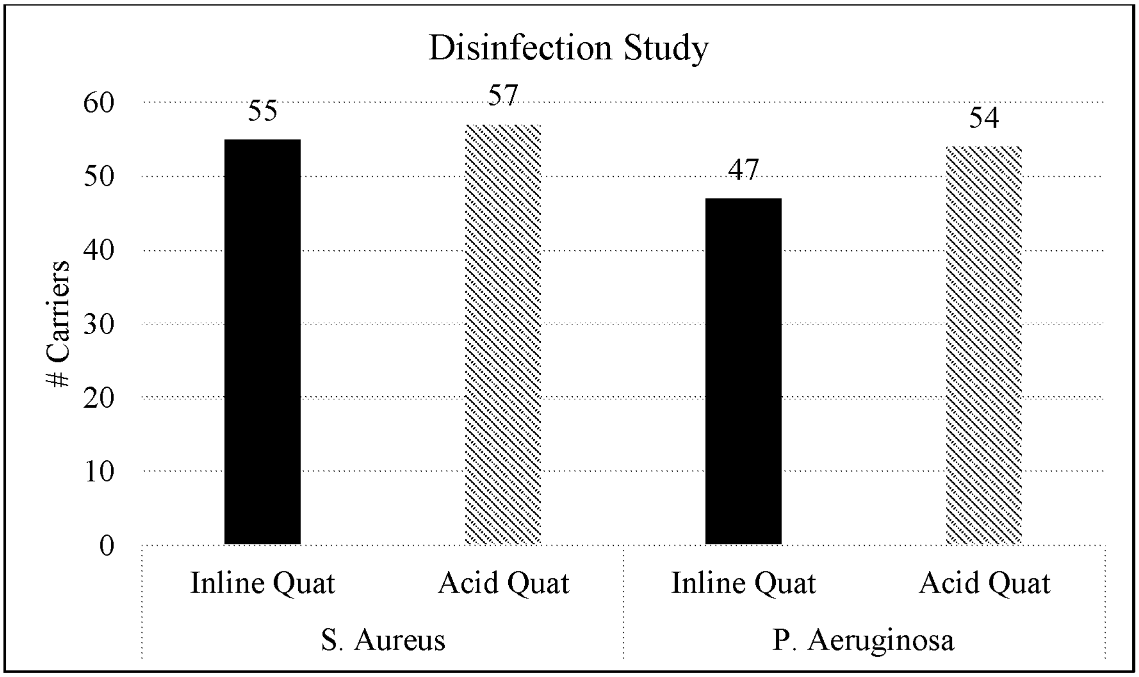
Disinfection Study
Carriers
60
50
40
30
20
10
0
55
57
47
54
Inline Quat
Acid Quat
Inline Quat
Acid Quat
S. Aureus
P. Aeruginosa

NO RINSE QUAT/ACID/ETHOXYLATED ALCOHOL DISINFECTANT COMPOSITION FOR FOOD CONTACT SURFACES

CROSS-REFERENCE TO RELATED APPLICATIONS

This application claims priority under 35 U.S.C. § 119 to U.S. Provisional Application Ser. No. 63/263,293 filed Oct. 29, 2021. The provisional patent application is herein incorporated by reference in its entirety, including without limitation, the specification, claims, and abstract, as well as any figures, tables, appendices, or drawings thereof.

TECHNICAL FIELD

The present disclosure relates to disinfecting and sanitizing compositions, particularly ready to use food contact disinfecting and sanitizing compositions with provide no rinse disinfection. The compositions comprise antimicrobial quaternary ammonium compounds, including alkyl dimethyl benzyl ammonium chlorides (ADBAC), alkyl dimethyl ethyl benzyl ammonium chlorides (ADEBAC), and dialkyl dimethyl ammonium chlorides (DAAC), in combination with an acid source, wherein the quaternary ammonium compound and acid together provide enhanced sanitizing efficacy at a pH of less than about 4 and even at very low concentrations of the antimicrobial quaternary ammonium compound. Disinfecting and sanitizing compositions and methods of employing the same beneficially provide sanitizing efficacy with 400 ppm or less of the quaternary ammonium compounds against various microorganisms, including *S. aureus* and *P. aeruginosa*.

TECHNICAL BACKGROUND

Antimicrobial agents are chemical compositions that are used to prevent microbiological contamination, particularly on food surfaces such as food products and/or food processing surfaces. Of the diverse categories of antimicrobial agents and compositions, quaternary ammonium compounds represent one of the largest of the classes of agents in use. It is known that quaternary ammonium compounds provide excellent antimicrobial efficacy against a variety of bacteria, fungi, algae, spores, viruses, and the like.

Despite the availability of quaternary ammonium compounds, it is still a challenge to provide effective antimicrobial compositions comprising quaternary ammonium compounds (or other antimicrobial agents) which are suitable for contact with food surfaces. Quaternary ammonium compounds are known to have poor surface activity and as such relatively high concentrations of actives are typically required to provide effective antimicrobial efficacy. Such concentrations may not be suitable for food surfaces—such as food products and/or food processing surfaces—which cannot contain high concentrations of antimicrobial agents due to risk of adulterating the food surface. As a result, most quaternary ammonium compounds fail to provide sufficient antimicrobial kill in dilute use solutions.

Even on food contact surfaces which would not be adulterated, it is undesirable to sanitize and/or disinfect using high concentrations of quaternary ammonium compounds because at high concentrations (above about 400 ppm) the surface must be rinsed after contact with the sanitizing/disinfecting composition. However, existing antimicrobial compositions, particularly those containing quaternary ammonium compounds, fail to provide sufficient antimicrobial efficacy at low concentrations of actives (400 ppm or less of the quaternary ammonium compound(s)).

Additionally, higher concentrations of actives increases the cost of manufacturing and can reduce the stability of the composition since quaternary ammonium compounds are known to have negative interactions with other surfactants. Finally, such compositions must provide excellent antimicrobial efficacy at low temperatures because some food products would be adulterated or spoiled by high temperatures and/or because high temperature disinfection/sanitization is costly or not possible.

There is therefore a need to develop compositions which provide effective antimicrobial efficacy on food surfaces even at a low concentration of actives, and wherein the composition can provide no rinse disinfection.

There is also a need to develop antimicrobial compositions which do not adulterate food products or food processing surfaces treated with the compositions.

It is further desirable to provide disinfecting and sanitizing compositions efficacious at a low temperature (including below about 120° F.) with the acidic pH and/or reduced concentration of the antimicrobial quaternary ammonium compound.

Other objects, embodiments and advantages will be apparent in view of the following disclosure, the drawings, and the appended claims.

BRIEF SUMMARY

Provided herein are acid sanitizing and cleaning compositions comprising between about 10 ppm to about 1000 ppm of an antimicrobial quaternary ammonium compound having the formula:

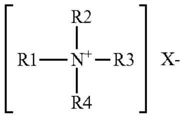

wherein $R_1$-$R_4$ are each one of an alkyl group having a $C_1$-$C_{16}$ chain length, a benzyl group, an alkyl benzyl group, or a combination thereof, and wherein X— is an anionic counterion and; between about 100 ppm to about 1500 ppm of an acid source; wherein the composition has a pH of ≤about 6. In an embodiment, the acid source is an organic acid. In a further embodiment, the organic acid is a carboxylic acid, a polycarboxylic acid, or a combination thereof. In an embodiment, the alkyl group of the quaternary ammonium compound is a $C_1$-$C_4$ chain and/or a $C_8$-$C_{12}$ chain, and wherein the benzyl or alkyl benzyl group is a methyl benzyl and/or ethyl benzyl group, and wherein the X— anionic counterion is a halide, methyl sulfate, carbonate, bicarbonate, or a combination thereof. In a further embodiment, the quaternary ammonium compound is an alkyl dimethyl benzyl ammonium chloride, alkyl dimethyl ethyl benzyl ammonium chloride, a dialkyl dimethyl ammonium chloride, octyl decyl dimethyl ammonium chloride, dioctyl dimethyl ammonium chloride, didecyl dimethyl ammonium chloride, didecyl dimethyl ammonium carbonate, didecyl dimethyl ammonium bicarbonate, or a combination thereof. In a still further embodiment, the quaternary ammonium compound is octyl decyl dimethyl, dioctyl dimethyl, didecyl dimethyl ammonium chloride, or a combination thereof.

In some embodiments, the composition comprises between about 300 ppm to about 400 ppm of the quaternary ammonium compound, and between about 100 ppm to about 500 ppm of the acid source. In an embodiment, the pH of the composition is less than about 4. In a preferred embodiment, the composition is free of oxidizing agents and additional antimicrobial agents that are not quaternary ammonium compounds.

Also disclosed herein are methods of cleaning a food contact surface comprising: contacting a food contact surface with a ready to use composition comprising between about 10 ppm to about 1000 ppm of an antimicrobial quaternary ammonium compound having the formula:

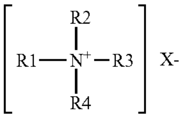

wherein $R_1$-$R_4$ are each one of an alkyl group having a $C_1$-$C_{16}$ chain length, a benzyl group, an alkyl benzyl group, or a combination thereof, and wherein X— is an anionic counterion and; and between about 100 ppm to about 1500 ppm of an acid source; wherein the composition has a pH of ≤about 6. In a further embodiment, the pH of the composition is less than about 4.

In some embodiments, the contacting occurs at a temperature below about 120° F. In some embodiments, the contacting occurs by spraying, dipping, soaking, immersing or wiping food contact surface. In an embodiment, the food contact surface is a ware, a food processing surface, a food product, or a combination thereof. In some embodiments the food processing surface is a table, sink, cutting board, food packaging material, aseptic packaging material, or a combination thereof; and in some embodiments, the ware is a utensil, plate, cup, glass, mug, bowl, or a combination thereof. In a further embodiment, the food product is meat, seafood, produce, eggs, plants, or a combination thereof.

The disclosure also relates to acidic sanitizing and disinfecting unit dose tablets comprising a quaternary ammonium compound having the formula:

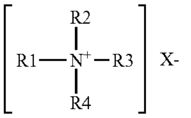

wherein $R_1$-$R_4$ are each one of an alkyl group having a $C_1$-$C_{16}$ chain length, a benzyl group, an alkyl benzyl group, or a combination thereof, and wherein X— is an anionic counterion and; a solid acid source; and optionally, a dissolution aid. In an embodiment, the dissolution aid comprises potassium carbonate, potassium bicarbonate, sodium carbonate, sodium bicarbonate, calcium carbonate, or a combination thereof.

In some embodiments, the quaternary ammonium compound is an alkyl dimethyl benzyl ammonium chloride, alkyl dimethyl ethyl benzyl ammonium chloride, a dialkyl dimethyl ammonium chloride, octyl decyl dimethyl ammonium chloride, dioctyl dimethyl ammonium chloride, didecyl dimethyl ammonium chloride, didecyl dimethyl ammonium carbonate, didecyl dimethyl ammonium bicarbonate, or a combination thereof; and in some embodiments, the acid source is a carboxylic acid, a polycarboxylic acid, or a combination thereof.

According to an embodiment, a use solution generated by contacting the tablet with a diluent comprises between about 300 ppm to about 400 ppm of the quaternary ammonium compound and between about 100 ppm to about 500 ppm of the solid acid source.

While multiple embodiments are disclosed, still other embodiments of the present disclosure will become apparent based on the detailed description, which shows and describes illustrative embodiments of the disclosure. The foregoing summary is illustrative only and is not intended to be in any way limiting. In addition to the illustrative embodiments, embodiments, and features described above, further embodiments, embodiments, and features of the present technology are apparent from the following drawings and the detailed description, which shows and describes illustrative embodiments of the present technology. Each feature of the technology described herein may be combined with any one or more other features of the disclosure, e.g., the methods may be used with any composition described herein.

BRIEF DESCRIPTION OF THE DRAWINGS

FIG. 1 shows a graph depicting the result of the use dilution test conducted to mirror antimicrobial efficacy on food surfaces as described in Example 1.

Various embodiments will be described in detail with reference to the drawings, wherein like reference numerals represent like parts throughout the several views. Reference to various embodiments does not limit the scope of the compositions and methods. Figures represented herein are not limitations to the various embodiments and are presented only for example illustration.

DETAILED DESCRIPTION OF THE PREFERRED EMBODIMENTS

The present disclosure relates to disinfecting and sanitizing compositions.

It has been surprisingly found that the antimicrobial quaternary ammonium compounds including alkyl dimethyl benzyl ammonium chlorides (ADBAC), alkyl dimethyl ethyl benzyl ammonium chlorides (ADEBAC), and dialkyl dimethyl ammonium chlorides (DAAC) in combination with an acid to provide a pH below about 7, about 5 or below, or preferably below about 4, provide sanitizing efficacy at lower concentrations of the quaternary ammonium compounds. Methods of employing the disinfecting and sanitizing compositions can also vary as described in the disclosure provided herein.

It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various embodiments are presented in a range format. It should be understood that the description in range format is merely for convenience and brevity and should not be construed as an inflexible limitation on the on particular embodiments. Accordingly, the description of a range should be considered to have specifically disclosed all the possible sub-ranges as well as individual numerical values within that range (e.g., 1 to 5 includes 1, 1.5, 2, 2.75, 3, 3.80, 4, and 5).

Certain terms are herein defined. Unless defined otherwise, all technical and scientific terms used herein have the same meaning as commonly understood in the technical field. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups), preferably octyl and decyl alkyl groups.

With respect to the quaternary ammonium compounds, the term "alkyl" or "alkyl groups" refers only to saturated hydrocarbons having one or more carbon atoms, including straight-chain alkyl groups (e.g., methyl, ethyl, propyl, butyl, pentyl, hexyl, heptyl, octyl, nonyl, decyl, etc.), preferably octyl and decyl alkyl groups. As described herein, the alkyl groups of the quaternary ammonium compounds preferably include alkyl and dialkyl groups.

As used herein, the term "free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %. Unless explicitly specified that a particular component is necessary, any component described herein may be excluded from an embodiment, i.e., the composition may be free of any component not specified as necessary.

As used herein, the term "microbe" is synonymous with microorganism. For the purpose of this patent application, successful microbial reduction is achieved when the microbial populations are reduced by at least about 50%, or by significantly more than is achieved by a wash with water. Larger reductions in microbial population provide greater levels of protection. Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbiostatic.

As used herein, the term "disinfectant" refers to an agent that kills all vegetative cells including most recognized pathogenic microorganisms. Disinfection can occur using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocidal agent by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the term "sanitizer" refers to an agent that reduces the number of bacterial contaminants to safe levels as judged by public health requirements. In an embodiment, sanitizers will provide at least a 99.999% reduction (5-log order reduction). These reductions can be evaluated using a procedure set out in Germicidal and Detergent Sanitizing Action of Disinfectants, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms. A sanitizing rinse provides a 99.999% reduction (5-log order reduction) of the desired organisms (including bacterial contaminants) at a use temperature. The various uses of the disinfecting and sanitizing compositions may employ different testing conditions and temperatures, depending upon the surfaces and applications of use.

As used herein, the term "use solution" refers to a mixture of two or more components in a diluent such as water at a concentration of actives sufficient for the intended application. "Use solution" and "ready to use solution," "ready to use composition" and "RTU" are used interchangeably herein. The mixture of two or more components may be provided as a use solution, or a use solution may be generated by contacting a liquid concentrate or solid with water.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the phrase "food processing surface" refers to a surface of a tool, a machine, equipment, a structure, a building, or the like that is employed as part of a food or beverage processing, preparation, or storage activity. Food processing surface is intended to encompass all surfaces used in brewing (including beer brewing and preparation of liquors and spirits) and winemaking processes (e.g., bright beer tanks and lines, fermentation vessels, mash tuns, bottling equipment, pipes, and storage vessels). Food processing surfaces are found and employed in food anti-spoilage air circulation systems, aseptic packaging, food refrigeration and cooler cleaners and sanitizers, blancher cleaning and sanitizing, food packaging materials, cutting boards, tables, countertops, third-sink sanitizing, beverage chillers and warmers, meat chilling or scalding waters, sanitizing gels, and the like.

As used herein, the phrase "food product" includes any food substance that might require treatment with an antimicrobial agent or composition and that is edible with or without further preparation. Food products include meat (e.g., red meat and pork), seafood, poultry, produce (e.g., fruits and vegetables), eggs, living eggs, egg products, ready to eat food, wheat, seeds, roots, tubers, leaves, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the disclosure include but are not limited to, those that include polycarbonate polymers (PC), acrilonitrile-butadiene-styrene polymers (ABS), and polysulfone polymers (PS). Another example type of plastic that can be cleaned using the compounds and compositions of the disclosure include polyethylene terephthalate (PET). Accordingly, articles which may be cleaned and sanitizes/disinfected include any article with a surface such as plasticware, cookware, dishware, flatware, glasses, cups, hard surfaces, glass surfaces, or a combination thereof.

As used herein, the term "free," "no," "substantially no" or "substantially free" refers to a composition, mixture, or ingredient that does not contain a particular compound or to which a particular compound or a particular compound-containing compound has not been added. In some embodiments, the reduction and/or elimination of hydrogen peroxide according to embodiments provide hydrogen peroxide-free or substantially-free compositions. Should the particular compound be present through contamination and/or use in a minimal amount of a composition, mixture, or ingredients, the amount of the compound shall be less than about 3 wt. %. More preferably, the amount of the compound is less than 2 wt. %, less than 1 wt. %, and most preferably the amount of the compound is less than 0.5 wt. %.

The term "surfactant" or "surface active agent" refers to an organic chemical that when added to a liquid, changes the properties of that liquid at a surface.

The term "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods and compositions may comprise, consist essentially of, or consist of the components and ingredients as well as other ingredients described herein. As used herein, "consisting essentially of" means that the methods and compositions may include additional steps, components, or ingredients, but only if the additional steps, components or ingredients do not materially alter the basic and novel characteristics of the claimed methods and compositions.

Disinfecting and Sanitizing Food Contact Compositions

According to embodiments, the disinfecting and sanitizing compositions include the quaternary ammonium compounds and an acid source. In solid embodiments the disinfecting and sanitizing compositions further include a solidification aid, builder, and/or filler. The disinfecting and sanitizing compositions can include additional functional ingredients and can be provided as concentrate or use compositions. Example food contact disinfecting and sanitizing compositions are shown in Table 1.

TABLE 1

| Material | Example Composition 1 (Liquid concentrate) (wt. %) | Example Composition 2 (Solid) (wt. %) | Example Composition 3 (Use Solution or RTU) (ppm) | Example Composition 4 (Use Solution or RTU) (ppm) |
|---|---|---|---|---|
| Quaternary Ammonium Compound | 1-40 | 10-50 | 100-3000 | 300-400 |
| Acid | 1-80 | 10-80 | 100-1500 | 100-1500 |
| Builder/Filler | 0 | 10-80 | 0-1500 | 0-1000 |
| Additional Functional Ingredients | 0-50 | 0-20 | 0-300 | 0-300 |

The compositions set forth in Table 1 have any suitable concentrate or use pH for applications of use, including from about 1 to about 12. However, according to benefits of the disinfecting and sanitizing compositions as described herein, an acidic pH is preferred, including pH<4, <5.5, and <5, and allows for use of a lower concentration (e.g., <400 ppm and as low as 300 ppm to provide micro efficacy of at least 5 log reduction) of the quaternary ammonium compounds in the composition.

Beneficially, the compositions are free of oxidizing agents. The compositions can further be free of free of anionic surfactants. Instead, the compositions provide a surfactant-based biocide, namely a quat-based biocide that can include defoaming surfactant and/or sheeting agent.

Quaternary Ammonium Compound

The food contact compositions include at least one quaternary ammonium compound with the acid source. Certain quaternary ammonium compounds ("quats") are known to have antimicrobial activity. Accordingly, various quaternary ammonium compound with antimicrobial activity can be used in the compositions. The term "quaternary ammonium compound" or "quat" generally refers to any composition with the following formula:

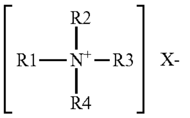

where $R_1$-$R_4$ each have less than a $C_{16}$ chain length (or $C_1$-$C_{16}$), wherein the $R_1$-$R_4$ are alkyl groups and/or benzyl or alkyl benzyl groups, and X— is an anionic counterion. In an embodiment the $R_1$-$R_4$ groups may be alike or different, substituted or unsubstituted, saturated or unsaturated, branched or unbranched, and cyclic or acyclic and may contain ether, ester, or amide linkages; they may be aromatic or substituted aromatic groups. The term "anionic counterion" includes any ion that can form a salt with quaternary ammonium. Examples of suitable counterions include halides such as chlorides and bromides, methyl sulfates, carbonates, and bicarbonates. Preferably, the anionic counterion is chloride. In some embodiments quaternary ammoniums have carbon chains between about 1 and 16, between about 8 and 16, preferably between 8 and 12, or more preferably between 8 and 10 are included in compositions. In embodiments the quaternary ammonium compounds have $R_1$-$R_4$ groups with alike or different alkyl chains between about 1 and 16, between about 8 and 16, preferably between 8 and 12, and/or between 8 and 10. In embodiments, the $R_1$-$R_4$ alkyl groups of the quaternary ammonium compound are $C_1$-$C_4$ and $C_8$-$C_{12}$, such as where two alkyl groups are $C_1$-$C_4$ and two alkyl groups are $C_8$-$C_{12}$. In further embodiments, the $R_1$-$R_4$ alkyl groups of the quaternary ammonium compound are $C_1$ and $C_5$-$C_{12}$, such as where two alkyl groups are $C_1$ (dimethyl) and two alkyl groups are $C_8$-$C_{12}$. In further embodiments at least one of $R_1$-$R_4$ is a benzyl or alkyl benzyl group, wherein the benzyl or alkyl benzyl group is a methyl benzyl or ethyl benzyl.

The quaternary ammonium compounds suitable for the disinfecting and sanitizing applications are water soluble compounds and can further include salts of the compounds described herein. Suitable salts include, for example, salts of both inorganic and organic acids, such as nitrate, sulfate, chloride, bromide, iodide, methyl sulfate, methyl sulfonate, carbonate, bicarbonate, carboxylates, polycarboxylates, phosphates, phosphonates, and the like.

Examples of suitable quaternary ammonium compounds include but are not limited to alkyl ($C_8$-$C_{16}$) dimethyl benzyl ammonium chloride (ADBAC), alkyl ($C_{8-16}$) dimethyl ethyl benzyl ammonium chloride (ADEB AC), didecyl dimethyl ammonium carbonate/bicarbonate and dialkyl ($C_8$-$C_{16}$) dimethyl ammonium chloride (DAAC), including octyl decyl dimethyl ammonium chloride, dioctyl dimethyl ammonium chloride, and didecyl dimethyl ammonium chloride. In preferred embodiments, the dialkyl dimethyl ammonium chloride (DAAC) is a dialkyl having $C_{10}$ or less ($C_8$-$C_{10}$). In a preferred embodiment, the quaternary ammonium compound is a blend of octyl decyl dimethyl, dioctyl dimethyl, and didecyl dimethyl ammonium chloride. A single quaternary ammonium or a combination of more than one quaternary ammonium may be included in compositions.

In some embodiments depending on the nature of the R group, the anion, and the number of quaternary nitrogen atoms present, the antimicrobial quaternary ammonium compounds may be classified into one of the following categories: monoalkyltrimethyl ammonium salts; alkyl methyl benzyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercially available under the tradenames Rhodaquat M242C/29 and Dehyquart A; alkyl trimethyl ammonium chloride, commercially available as Arquad 16; alkyl aryl trimethyl ammonium chloride; and cetyl dimethyl ethyl ammonium bromide, commercially available as Ammonyx DME.

Monoalkyldimethylbenzyl ammonium salts contain one R group that is a long-chain alkyl group, a second R group that is a benzyl or alkyl benzyl group, and the two remaining R groups are short-chain alkyl groups, such as methyl or ethyl groups. Monoalkyldimethylbenzyl ammonium salts are generally compatible with nonionic surfactants, detergent builders, perfumes, and other ingredients. Some non-limiting examples of monoalkyldimethylbenzyl ammonium salts include alkyl dimethyl benzyl ammonium chlorides, commercially available as Barquat from Lonza Inc. and benzethonium chloride, commercially available as Lonzagard, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyl dimethyl benzyl and alkyl dimethyl substituted benzyl (ethyl benzyl) ammonium chlorides commercially available as BTC 2125M from Stepan Company, and Barquat 4250 from Lonza Inc.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyl dimethyl ammonium halides, commercially available as Bardac 22 from Lonza Inc.; didecyl dimethyl ammonium chloride commercially available as Bardac 2250 from Lonza Inc.; dioctyl dimethyl ammonium chloride, commercially available as Bardac LF and Bardac LF-80 from Lonza Inc.); and octyl decyl dimethyl ammonium chloride sold as a mixture with didecyl and dioctyl dimethyl ammonium chlorides, commercially available as Bardac 2050 and 2080 from Lonza Inc.

In liquid disinfecting and sanitizing composition embodiments, the quaternary ammonium compound is included in the disinfecting and sanitizing composition at an amount of at least about 1 wt. % to about 50 wt. %, about 5 wt. % to about 50 wt. %, about 5 wt. % to about 40 wt. %, about 10 wt. % to about 40 wt. %, or about 10 wt. % to about 20 wt.

%. In other embodiments the quaternary ammonium compound is included in the disinfecting and sanitizing composition at an amount of at least about 1 wt. % to about 20 wt. %. In solid disinfecting and sanitizing composition embodiments, the quaternary ammonium compound is included in the disinfecting and sanitizing composition at an amount of at least about 1 wt. % to about 70 wt. %, about 1 wt. % to about 60 wt. %, about 1 wt. % to about 50 wt. %, about 1 wt. % to about 40 wt. %, about 1 wt. % to about 30 wt. %, or about 10 wt. % to about 30 wt. %. In other embodiments the quaternary ammonium compound is included in the disinfecting and sanitizing composition at an amount of at least about 1 wt. % to about 20 wt. %. In addition, without limitation, all ranges recited are inclusive of the numbers defining the range and include each integer within the defined range.

In liquid composition embodiments, the quaternary ammonium compound is included in the composition at an amount of at least about 0.5 wt. % to about 60 wt. %, about 1 wt. % to about 60 wt. %, about 1 wt. % to about 50 wt. %, about 5 wt. % to about 50 wt. %, or about 10 wt. % to about 50 wt. %. In solid disinfecting and sanitizing composition embodiments, the quaternary ammonium compound is included in the composition at an amount of at least about 0.5 wt. % to about 50 wt. %, 1 wt. % to about 40 wt. %, about 1 wt. % to about 35 wt. %, about 1 wt. % to about 30 wt. %, or about 5 wt. % to about 30 wt. %. In addition, without limitation, all ranges recited are inclusive of the numbers defining the range and include each integer within the defined range.

Acid Source

The disinfecting and sanitizing compositions include at least one acid source with the quaternary ammonium compound. The acid forms a concentrate composition or a use solution with a desired acidic to neutral pH. The acid can be effective to form a use composition with pH of about 7, about 6 or less, about 5 or less, about 4, about 4 or less, about 3, about 3 or less, about 2, about 2 or less, or the like.

In an embodiment, the acid is an organic acid. Suitable organic acids include, but are not limited to, methane sulfonic acid, ethane sulfonic acid, propane sulfonic acid, butane sulfonic acid, xylene sulfonic acid, benzene sulfonic acid, and mono, di, or tri-carboxylic acids, picolinic acid, dipicolinic acid, and mixtures thereof. In a preferred embodiment the acid is a carboxylic acid or polycarboxylic acid, or salt thereof. In a further preferred embodiment, the acid is lactic acid or citric acid. Beneficially, the acid component can further aid with defoaming of the disinfecting and sanitizing compositions and does not negatively interfere with the microbial efficacy of the quaternary ammonium compound.

In liquid disinfecting and sanitizing composition embodiments, the acid source is included in the disinfecting and sanitizing composition at an amount of at least about 1 wt. % to about 90 wt. %, about 5 wt. % to about 90 wt. %, about 10 wt. % to about 90 wt. %, or about 10 wt. % to about 80 wt. %. In other embodiments the acid source is included in the disinfecting and sanitizing composition at an amount of at least about 1 wt. % to about 50 wt. %. In solid disinfecting and sanitizing composition embodiments, the acid source is included in the disinfecting and sanitizing composition at an amount of at least about 1 wt. % to about 90 wt. %, 5 wt. % to about 90 wt. %, about 10 wt. % to about 90 wt. %, or about 10 wt. % to about 80 wt. %. In other embodiments the acid source is included in the disinfecting and sanitizing composition at an amount of at least about 1 wt. % to about 50 wt. %. In addition, without limitation, all ranges recited are inclusive of the numbers defining the range and include each integer within the defined range.

In liquid disinfecting and sanitizing composition embodiments, the acid source is included in the composition at an amount of at least about 0.01 wt. % to about 60 wt. %, about 0.01 wt. % to about 50 wt. %, about 0.1 wt. % to about 50 wt. %, or about 1 wt. % to about 50 wt. %. In solid disinfecting and sanitizing composition embodiments, the acid source is included in the composition at an amount of at least about 1 wt. % to about 90 wt. %, 5 wt. % to about 90 wt. %, about 10 wt. % to about 90 wt. %, or about 10 wt. % to about 80 wt. %. In addition, without limitation, all ranges recited are inclusive of the numbers defining the range and include each integer within the defined range.

Defoaming Surfactant

The disinfecting and sanitizing compositions may optionally include at least one defoaming surfactant and/or sheeting agent in addition to the acid source and quaternary ammonium compound. Defoaming surfactants are useful for reducing the stability of foam that may be created by the quaternary ammonium compound(s) and/or sheeting agent in an aqueous solution. Defoaming surfactants preferably include nonionic surfactants including alcohol alkoxylates, alkyl capped PO surfactants and EO/PO copolymers and block copolymers. In an embodiment the defoaming surfactant is an alkyl capped PO surfactant with a cloud point below room temperature. In some embodiments, the defoaming surfactants can be food grade quality suitable for contact with food surfaces. In some embodiments an anti-foaming agent could be used in addition to the defoaming surfactant or in place thereof.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water-soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic and Tetronic manufactured by BASF Corp. Pluronic compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic compounds are tetra-functional block copolymers derived from the sequential addition of propylene oxide and ethylene oxide to ethylenediamine. The molecular weight of the propylene oxide hydrotype ranges from about 500 to about 7,000; and the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal manufactured by Rhodia and Triton manufactured by Dow Chemical Company.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol manufactured by Shell Chemical Co. and Alfonic manufactured by Sasol North America Inc.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Examples of nonionic low foaming surfactants include compounds which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics are manufactured by BASF Corporation under the trade name Pluronic surfactants. Likewise, the Tetronic surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds described herein can also be modified by "capping" or "end blocking" the terminal hydroxy group or groups (of multi-functional moieties) to reduce foaming by reaction with a small hydrophobic molecule such as propylene oxide, butylene oxide, benzyl chloride; and short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486, which is herein incorporated by reference in its entirety, and represented by the formula

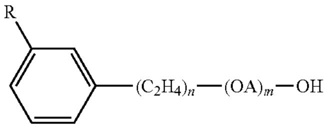

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548, which is herein incorporated by reference in its entirety, having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178, which is herein incorporated by reference in its entirety, having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, which is herein incorporated by reference in its entirety, corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, which is herein incorporated by reference in its entirety, having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerin, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: $R_1$ is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_S$N-$(EO)_t$H, $R^{20}$—$(PO)_S$N-$(EO)_t$H$(EO)_t$H, and $R^{20}$—N$(EO)_t$H; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—N$[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic PEA 25 Amine Alkoxylate. Preferred nonionic surfactants for the compositions include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 provides examples of suitable nonionic compounds. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

In addition to defoaming surfactants, antifoaming agents includes silicones. Silicones such as dimethyl silicone, glycol polysiloxane, methylphenol polysiloxane, trialkyl or tetraalkyl silanes, hydrophobic silica defoamers and mixtures thereof can all be used in defoaming applications. Commercial defoamers commonly available include silicones such as Ardefoam from Armour Industrial Chemical Company which is a silicone bound in an organic emulsion; Foam Kill or Kresseo available from Krusable Chemical Company which are silicone and non-silicone type defoamers as well as silicone esters; and Anti-Foam A and DC-200 from Dow Corning Corporation which are both food grade type silicones among others.

In liquid disinfecting and sanitizing composition embodiments with a defoaming surfactant, the defoaming surfactant is included in the composition at an amount of at least about 0.01 wt. % to about 40 wt. %, about 0.01 wt. % to about 40 wt. %, about 0.5 wt. % to about 25 wt. %, or about 0.5 wt. % to about 15 wt. %. In solid disinfecting and sanitizing composition embodiments with a defoaming surfactant, the defoaming surfactant is included in the composition at an amount of at least about 0.01 wt. % to about 40 wt. %, about 0.01 wt. % to about 40 wt. %, about 0.5 wt. % to about 25 wt. %, or about 0.5 wt. % to about 15 wt. %. In addition, without limitation, all ranges recited are inclusive of the numbers defining the range and include each integer within the defined range.

Sheeting Agent

The disinfecting and sanitizing compositions may optionally include at least one sheeting agent and/or defoaming surfactant in addition to the acid source and quaternary ammonium compound.

Suitable sheeting agents include without limitation alcohol ethoxylates. The alcohol ethoxylate compounds that include an alkyl group that has 12 or fewer carbon atoms have the structure represented by Formula I: R—O—$(CH_2CH_2O)_n$—H (I) wherein R is a $(C_1$-$C_{12})$ alkyl group and n is an integer in the range of 1 to 100. In some embodiments, R may be a $(C_8$-$C_{12})$ alkyl group, or may be a $(C_8$-$C_{10})$ alkyl group. Similarly, in some embodiments, n is an integer in the range of 10-50, or in the range of 15-30, or in the range of 20-25. In some embodiments, alcohol ethoxylate has a low EO content, such as n of 6 or less.

In at least some embodiments, the sheeting agent includes at least two different alcohol ethoxylate compounds each having structure represented by Formula I. That is, the R and/or n variables of Formula I, or both, may be different in the two or more different alcohol ethoxylate compounds present in the sheeting agent. For example, the sheeting agent in some embodiments may include a first alcohol ethoxylate compound in which R is a $(C_8$-$C_{10})$ alkyl group, and a second alcohol ethoxylate compound in which R is a $(C_{10}$-$C_{12})$ alkyl group. In at least some embodiments, the sheeting agent does not include any alcohol ethoxylate compounds that include an alkyl group that has more than 12 carbon atoms. In some embodiments, the sheeting agent includes only alcohol ethoxylate compounds that include an alkyl group that has 12 or fewer carbon atoms.

In some embodiments, the alcohol ethoxylates used in the sheeting agent can be chosen such that they have certain characteristics, for example, are environmentally friendly, are suitable for use in food service industries, and/or the like. For example, the particular alcohol ethoxylates used in the sheeting agent may meet environmental or food service regulatory requirements, for example, biodegradability requirements.

In liquid and/or solid disinfecting and sanitizing composition embodiments with a sheeting agent, the sheeting agent is included in the composition at an amount of at least about 0.01 wt. % to about 40 wt. %, about 0.1 wt. % to about 40 wt. %, about 0.1 wt. % to about 25 wt. %, or about 0.1 wt. % to about 15 wt. %. In addition, without limitation, all ranges recited are inclusive of the numbers defining the range and include each integer within the defined range.

Builder and/or Filler

The solid embodiments of the disinfecting and sanitizing composition compositions and the disinfecting and sanitizing compositions optionally include at least one builder and/or filler. Example agents can include sodium sulfate, sodium chloride, magnesium sulfate, starches, sugars, $C_1$-$C_{10}$ alkylene glycols such as propylene glycol and the like. Further example agents can include solid PEG, solid PPG, solid EP/PO, amides, urea, salts, such as phosphates, sulfates, acetates, borates or silicates, and the like.

In solid disinfecting and sanitizing composition embodiments, the builder(s) and/or filler(s) is/are included in the disinfecting and sanitizing composition at an amount of at least about 1 wt. % to about 90 wt. %, 5 wt. % to about 90 wt. %, about 10 wt. % to about 90 wt. %, or about 10 wt. % to about 80 wt. %. In solid disinfecting and sanitizing composition embodiments, the builder(s) and/or filler(s) is/are included in the composition at an amount of at least about 1 wt. % to about 90 wt. %, 5 wt. % to about 90 wt. %, about 10 wt. % to about 90 wt. %, or about 10 wt. % to about 80 wt. %. In addition, without limitation, all ranges recited are inclusive of the numbers defining the range and include each integer within the defined range.

Solidifying Agents

The food contact compositions may optionally include one or more solidifying agents (also referred to as hardening agents) use to modify the viscosity of the composition and/or form the composition into a solid. Solidifying agents can include a compound or system of compounds, organic or inorganic, which significantly contribute to the uniform solidification of the solid composition. The solidifying agents should be capable of forming a homogeneous matrix with the active components of the solid composition when mixed and solidified to provide a uniform dissolution of the actives from the solid composition during use.

An example solidifying agent includes urea. Urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Additional solidifying agents may be an organic hardening agent, including for example: a polyethylene glycol (PEG) compound, suitable examples including solid polyethylene glycols of the general formula $H(OCH_2CH_2)nOH$, where n is greater than 15, particularly approximately 30 to approximately 1700, such as PEG 4000, PEG 1450, and PEG 8000 among others. Still further, PEG can include varying molecular weights, for example, molecular weight of about 1,400 to about 30,000. In certain embodiments, the solidifying agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename Carbowax.

Additional solidifying agents may be an inorganic hardening agent, including but not limited to hydratable inorganic salts, including, but not limited to carbonates, sulfates and bicarbonates, which may be an alkali metal or alkali earth metal salt. Suitable salts include lithium, sodium, potassium, calcium, magnesium, iron, strontium, zinc, manganese, lanthanum, titanium, gallium, aluminum, cobalt, copper, molybdenum, rhenium, rhodium, scandium, tin and zirconium. Suitable metal salts include sodium, lithium, potassium salts including, but not limited to sulfates, chlorides, phosphates, acetates, nitrates, and carbonates. Particularly useful metals salts include lithium, sodium and potassium sulfates, chlorides and acetates.

Still further, solidifying agents can include polymers and thickeners include natural gums such as xanthan gum, guar gum, or other gums from plant mucilage; polysaccharide based thickeners, such as alginates, starches, and cellulosic polymers (e.g., carboxymethyl cellulose); solid EO/PO block copolymers; polyacrylates; and hydrocolloids. In an embodiment, the thickener does not leave contaminating residue on the surface of an object. For example, the thickeners or gelling agents can be compatible with food or other sensitive products in contact areas.

The solidifying agents can be present in the composition at range from about 0 wt. % to about 70 wt. %, about 0 wt. % to about 50 wt. %, about 0.01 wt. % to about 30 wt. %, from about 0.01 wt. % to about 20 wt. %, or from about 1 wt. % to about 20 wt. %, inclusive of all integers within these ranges. The solidifying agents can be used to form a solid disinfecting and sanitizing composition, which can be contacted with water or other suitable diluent to generate a use solution having a low pH and a beneficially low concentration of quaternary ammonium compound.

Dissolution Aid

The disinfecting and sanitizing food contact compositions may optionally include a dissolution aid. A dissolution aid assists in the dissolution of a composition (typically a solid composition) in a diluent (e.g., water), providing rapid and uniform distribution of the composition in the diluent. Suitable dissolution aids include one or more of percarbonates, carbonates, and bicarbonates, and their salts thereof. For example, dissolution aids may include one or more of potassium carbonate, potassium bicarbonate, sodium carbonate, sodium bicarbonate, or calcium carbonate.

When used in the composition, the dissolution aid may be present in any suitable concentration, for example between about 0 wt. % to about 70 wt. %, about 0 wt. % to about 50 wt. %, about 0.01 wt. % to about 30 wt. %, from about 0.01 wt. % to about 20 wt. %, or from about 1 wt. % to about 20 wt. %, inclusive of all integers within these ranges.

Additional Functional Ingredients

The components of the food contact compositions can further be combined with various functional components suitable for uses disclosed herein. In some embodiments, the compositions including the acid and quaternary ammonium compounds make up a large amount, or even substantially all of the total weight of the compositions. For example, in some embodiments few or no additional functional ingredients are disposed therein.

In other embodiments, additional functional ingredients may be included in the disinfecting and sanitizing compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the compositions may include additional functional ingredients including, for example, additional surfactants, thickeners and/or viscosity modifiers, solvents, solubility modifiers, humectants, metal protecting agents, stabilizing agents, e.g., chelating agents or sequestrants, corrosion inhibitors, sequestrants and/or chelating agents, solidifying agent, sheeting agents, pH modifying components, including alkalinity and/or acidity sources, aesthetic enhancing agents (i.e., colorants, odorants, or perfumes), other cleaning agents, hydrotropes or couplers, buffers, and the like. Additionally, the compositions can be used in conjunction with one or more conventional cleaning agents.

In liquid disinfecting and sanitizing composition embodiments, the additional functional ingredient(s) is included in the disinfecting and sanitizing composition at an amount of at least about 0 wt. % to about 50 wt. %, about 0 wt. % to about 40 wt. %, or about 0 wt. % to about 20 wt. %. In solid disinfecting and sanitizing composition embodiments, the additional functional ingredient(s) is included in the disinfecting and sanitizing composition at an amount of at least about 0 wt. % to about 50 wt. %, about 0 wt. % to about 40 wt. %, or about 0 wt. % to about 20 wt. %. In addition, without limitation, all ranges recited are inclusive of the numbers defining the range and include each integer within the defined range.

In liquid disinfecting and sanitizing composition embodiments, the additional functional ingredient(s) is included in the disinfecting and sanitizing composition at an amount of at least about 0 wt. % to about 50 wt. %, about 0 wt. % to about 40 wt. %, or about 0 wt. % to about 20 wt. %. In solid disinfecting and sanitizing composition embodiments, the additional functional ingredient(s) is included in the disinfecting and sanitizing composition at an amount of at least about 0 wt. % to about 50 wt. %, about 0 wt. % to about 40 wt. %, or about 0 wt. % to about 20 wt. %. In addition, without limitation, all ranges recited are inclusive of the numbers defining the range and include each integer within the defined range.

Example Compositions

The disinfecting and sanitizing compositions may include concentrate compositions and use compositions, or may be diluted to form use compositions. For example, a concentrate composition can be diluted, for example with water, to form a use composition. In general, a concentrate refers to a composition that is intended to be diluted, such as with water to provide a use solution that contacts a surface and/or product in need of treatment to provide the desired surface activity. The disinfecting and sanitizing compositions that contact the surface and/or product in need of treatment can be referred to as a concentrate or a use composition (or use solution) dependent upon the formulation employed in methods as described herein. It should be understood that the concentration of the quaternary ammonium compound in the composition will vary depending on whether the composition is provided as a concentrate or as a use solution. In an embodiment, a concentrate composition can be diluted to a use solution before applying to an object. The concentrate can be marketed and an end user can dilute the concentrate with water or an aqueous diluent to a use solution.

Compositions can be formulated and sold for use as is, or as concentrates. If desired, such concentrates can be used full-strength as disinfecting and sanitizing compositions. However, the concentrates typically will be diluted with a fluid (e.g., water) that subsequently forms the dilute phase or a use solution. Preferably, the concentrate forms a single phase before such dilution and remains so while stored in the container in which it will be sold. When combined with water or other desired diluting fluid at an appropriate dilution level and subjected to mild agitation (e.g., by stirring or pumping the composition), some compositions will form a pseudo-stable dispersion, and other compositions will form a clear or quasi-stable solution or dispersion. If a pseudo-stable composition is formed, then the composition preferably remains in the pseudo-stable state for a sufficiently long period so that the composition can be applied to a surface before the onset of phase separation. The pseudo-stable state need only last for a few seconds when suitably rapid application techniques such as spraying are employed, or when agitation during application is employed. The pseudo-stable state desirably lasts for at least one minute or more after mixing and while the composition is stored in a suitable vessel, and preferably lasts for five minutes or more after mixing. Often normal refilling or replenishment of the applicator (e.g., by dipping the applicator in the composition) will provide sufficient agitation to preserve the pseudo-stable state of the composition during application.

A use solution may be prepared from the concentrate by diluting the concentrate with water at a dilution ratio that provides a use solution having desired disinfecting, sanitizing and/or other antimicrobial properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an embodiment, a concentrate composition can be diluted to a use solution before applying to an object. The concentrate can be marketed and an end user can dilute the concentrate with water or an aqueous diluent to a use solution. The level of active components in the concentrate composition is dependent on the intended dilution factor and the desired activity of the antimicrobial composition. Generally, a dilution of about 1 fluid ounce to about 10 gallons of water to about 10 fluid ounces to about 1 gallon of water is used for aqueous compositions. In some embodiments, higher use dilutions can be employed if elevated use temperature (greater than 25° C.) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water.

In some embodiments, the concentrated compositions can be diluted at a dilution ratio of about 0.1 g/L to about 100 g/L concentrate to diluent, about 0.5 g/L to about 10.0 g/L concentrate to diluent, about 1.0 g/L to about 4.0 g/L concentrate to diluent, or about 1.0 g/L to about 2.0 g/L concentrate to diluent.

In other embodiments, a use composition can include about 0.01 to about 10 wt. % of a concentrate composition and about 90 to about 99.99 wt. % diluent; or about 0.1 to about 1 wt. % of a concentrate composition and about 99 to about 99.9 wt. % diluent.

Amounts of an ingredient in a use composition can be calculated from the amounts listed above for concentrate compositions and these dilution factors. In some embodiments, the concentrated compositions are diluted such that the quaternary ammonium component is present at from about 100 ppm to about 3000 ppm, or preferably about 300 ppm to about 400 ppm.

In an embodiment, the concentrated compositions and use compositions maintain their disinfecting and sanitizing efficacy while being tolerant to water conditions, or are independent of water conditions such as water hardness. According to embodiments, compositions are tolerant of water conditions of about 0 parts per million (ppm) to about 500 ppm (about 0 to about 30 grains per gallon) water hardness without impacting disinfecting or sanitizing efficacy according to embodiments described herein. As referred to herein, the ppm of water hardness refers to ppm of calcium, magnesium and other metals which may be found in the water and contributing to the hardness level.

Form of the Composition

The compositions may be provided in any suitable form, including but not limited to a liquid concentrate, use solution, solid, gel, foam, and the like. Suitable solid compositions include, but are not limited to, granular and pelletized solid compositions, flakes, powders, granules, pellets, tablets, lozenges, pucks, briquettes, bricks, unit dose tablets, bricks, extruded solids, cast solids, and/or pressed solids. For a pressed solid, a flowable solid, such as a granular solid or other particle solid, is combined under pressure to form a solid composition. Solid compositions can be any suitable weight, including between 1 mg to about 2.5 kilograms, inclusive of all integers within this range.

Alternatively, the compositions may be provided as a liquid concentrate. Both solid and liquid concentrate compositions may be contacted with a diluent, such as water, to provide a use solution, which may be subsequently applied to a food contact surface.

The compositions may also be provided as a ready to use solution. Regardless of the initial form of the composition, the compositions are preferably diluted such that the composition comprises between about 100 ppm to about 3000 ppm, more preferably between about 300 ppm to about 400 ppm of the quaternary ammonium compound.

Methods of Cleaning a Food Contact Surface

The compositions can be employed in various food contact disinfecting and/or sanitizing applications. Beneficially, the compositions are non-corrosive, low odor, and will not adulterate a food product, in addition to providing microbial efficacy. Beneficially, the methods do not require a rinse step. In an embodiment, the compositions are food contact approved and do not require a rinse step. As a further benefit, the methods do not cause corrosion and/or interfere with surfaces (e.g., hazy, dull or other negative aesthetic effects on the surface).

In an embodiment, the method of use may include contacting a food contact surface with the disinfecting and sanitizing composition to form a treated surface. The methods of use may include wiping the treated surface with a wipe imbibed with the disinfecting and sanitizing composition to remove soil and/or microbial populations from the treated surface. The methods of use may also include allowing the treated surface to air dry with no rinsing required. Alternatively, the methods may include rinsing the treated surface. The composition may also be provided in a form other than within a wipe (e.g., as a liquid sprayed, squeezed, squirted, dispensed, or pumped from a container either manually or by machine). To sanitize with such a spray or other liquid, the liquid may be sprayed or otherwise applied (e.g., dipped, soaked, immersed, added as part of a wash cycle, etc.) until the food contact surface is thoroughly wetted. In some embodiments, the methods can further include a precleaning step, such as where a cleaning composition is applied, wiped and/or rinsed, and thereafter followed by the applying of the compositions. The methods of contacting may be repeated as many times as desired until the treated surface is clean and sanitized.

The compositions may be applied to a food contact surface by any suitable method including by spraying, dipping, soaking, immersing, or otherwise dispensing the composition and/or by wiping the surface with a substrate imbibed with the composition. A wide variety of materials can be used as the cleaning substrate; however, the substrate should have sufficient wet strength, porosity, and desired abrasiveness. Suitable substrates include, without limitation, nonwoven substrates, woven substrates, hydroentangled substrates, or sponges. For example, the substrate may be in the form of a wipe.

The compositions can be applied at a use or concentrate solution pH between about 0 to about 12. However, the benefits of using a lower concentration of the quaternary ammonium compound are best achieved for the disinfecting and/or sanitizing efficacy at a use solution pH between about 1 and about 7, between about 1 and about 6, and most preferably between about 1 and about 5.5, between about 1 and about 5, or between about 1 and about 4. In another embodiment the use solution pH of the composition is between about 2 and about 5.5, between about 2 and about 5, or between about 2 and about 4. Without limitation, the numeric ranges are inclusive of the numbers defining the range and include each integer within the defined range.

The disinfecting and sanitizing compositions are in contact with a surface or object for a sufficient amount of time to clean the surface or object. In an embodiment, the surface or object is contacted with the disinfecting and sanitizing composition for at least a few seconds, at least about 15 seconds, at least about 30 seconds, at least about 1 minute, or at least about 10 minutes.

The disinfecting and sanitizing compositions can be applied as a use or concentrate solution to a surface or object in need of cleaning. In an embodiment, a use solution of the disinfecting and sanitizing composition includes from about 100 ppm to about 3000 ppm of the quaternary ammonium compound, including all ranges there between. There is a cost benefit to use of lower concentrations of the compounds, namely below about 400 ppm and even as low as 300 ppm. Beneficially, in various applications of use a lower concentration of the quaternary ammonium compound when provided in combination with the acid to provide the preferred acidic pH and provides unexpected antimicrobial efficacy against a broad spectrum of microbes. Without being limited to a particular mechanism of action, the low actives of the quaternary ammonium compound is a result of the quaternary ammonium compound structure and combination with the acid to provide an acidic pH providing synergistic efficacy.

The methods of use can be employed at a broad temperature range, including both low temperature (including below about 120° F.) or at temperatures in excess of about 120° F. It is a benefit to the methods of using the disinfecting and sanitizing compositions that the combination of the acidic pH use solution pH to enable reduced concentration of the antimicrobial quaternary ammonium compounds can be employed at varying temperature ranges depending upon the selected use solution pH and antimicrobial quaternary ammonium compounds concentrations. For example, in an embodiment, wherein the pH of the use composition is ≤7 and the use solution of the composition provides a quaternary ammonium compound concentration in a lower range of from about 100 ppm to about 3000 ppm a temperature of at least about 120° F. may be employed to provide the desired sanitizing efficacy of at least a 5-log (≥99.999%) reduction of microorganisms. In embodiments, wherein the pH of the use composition is ≤7 and the use solution of the composition provides a quaternary ammonium compound concentration in a higher range of at least about 3000 ppm a temperature of less than about 120° F. may be employed to provide the desired sanitizing efficacy of at least a 5-log (≥99.999%) reduction of microorganisms.

In still another embodiment, the methods include a method of treating a food product comprising contacting a food product with an effective amount of the food contact composition, wherein the contacting step lasts for sufficient time to stabilize or reduce a microbial population in and/or on the treated food product.

In some embodiments, the food product to be treated by the present methods can be a food item or a plant item and/or at least a portion of a medium, a container, an equipment, a system or a facility for growing, holding, processing, packaging, storing, transporting, preparing, cooking or serving the food item or the plant item. The present methods can be used for treating any suitable plant item. In some embodiments, the plant item is a grain, fruit, vegetable or flower plant item. In other embodiments, the plant item is a living plant item or a harvested plant item. In still other embodiments, the plant item comprises a seed, a tuber, a growing plant, a cutting, or a root stock. In yet other embodiments, the present methods are used for treating a living plant tissue comprising treating the plant tissue with the above composition in a diluted concentration to stabilize or reduce microbial population in and/or on the plant tissue.

In other embodiments, the food item can be an animal product, e.g., an animal carcass or an egg, a fruit item, a vegetable item, or a grain item. In some embodiments, the animal carcass can be a beef, pork, veal, buffalo, lamb, fish, sea food or poultry carcass. In other embodiments, the sea food carcass can be scallop, shrimp, crab, octopus, mussel, squid or lobster. In still other embodiments, the fruit item can be a botanic fruit, a culinary fruit, a simple fruit, an aggregate fruit, a multiple fruit, a berry, an accessory fruit or a seedless fruit. In yet other embodiments, the vegetable item can be a flower bud, a seed, a leaf, a leaf sheath, a bud, a stem, a stem of leaves, a stem shoot, a tuber, a whole-plant sprout, a root or a bulb. In yet other embodiments, the grain item can be maize, rice, wheat, barley, sorghum, millet, oat, triticale, rye, buckwheat, fonio or quinoa.

In other embodiments, the surface can be a tissue surface. Example tissue surfaces include mammalian skin, such as animal or human skin, including for example human hands.

The methods can be used for treating a food product that is at least a portion of a container, an equipment, a system or a facility for holding, processing, packaging, storing, transporting, preparing, cooking or serving the food item or the plant item. In some embodiments, the food product is at least a portion of a container, an equipment, a system or a facility for holding, processing, packaging, storing, transporting, preparing, cooking or serving a meat item, a fruit item, a vegetable item, or a grain item. In other embodiments, the food product is at least a portion of a container, an equipment, a system or a facility for holding, processing, packaging, storing, or transporting an animal carcass. In still other embodiments, the food product is at least a portion of a container, an equipment, a system or a facility used in food processing, food service or health care industry. In yet other embodiments, the food product is at least a portion of a fixed in-place process facility. An example fixed in-place process facility can comprise a milk line dairy, a continuous brewing system, a pumpable food system or a beverage processing line.

Additionally, the methods can optionally include the use of various sensors and/or indicators. In an embodiment, the level of active ingredients in use solution can be monitored by various ways. In one approach, the pH of the solution at which the product will start to lose its biocidal efficacy significantly is visually indicated by a color change, and the color change is achieved by choosing a dye that show dramatic color change at this pH. The dye could be simply incorporated into the product, and preferably the dye is incorporated into a polymeric substrate to form a color change strip, and the strip will put in the container, for example the third sink to show the color change when the solution pass the critical pH value. Additionally, the level of anionic surfactants in use solution could also be monitored by a similar manner, where a color change will indicate the critical concentration of anionic surfactant needed for biocidal efficacy.

In an additional embodiment, as an alternative to visual indicators, properties of the use solution including pH, anionic activity, fluorescence, and/or conductivity can be monitored by sensors that provide a visual or audible signal when the solution is no longer within a specified range. In some embodiments, a marker molecule can be added to the composition, where the change of the active ingredients in the use solution will trigger the physical and/or chemical property changes of the marker molecule, and the change is quantified through a signal processing.

Methods of Cleaning a Ware

The compositions disclosed herein may also be used in cleaning, sanitizing, and/or disinfecting a ware, particularly a ware used with food products. Generally, a wash cycle for ware includes one or more steps comprising a wash phase, a rinse phase, and a drying phase. The wash cycle may also include a pre-soak phase or any other treatment phase, such as a sanitizing phase. The compositions described herein may be contacted with the ware at any part of the wash cycle.

The methods of disinfecting and/or sanitizing ware comprise a) contacting a ware with the disinfecting and sanitizing composition and b) removing a soil or killing one or more microbes on the ware, or a combination thereof. In an embodiment, the method optionally comprises a rinse step. In some embodiments, the method does not include a rinse step.

In an embodiment, the methods of warewashing comprise a) washing one or more ware in a first washing step with the compositions described herein having an acidic pH; b) optionally pausing; c) optionally washing the one or more ware in a first alkaline cleaning step with a composition having a basic pH; d) optionally pausing; and e) optionally rinsing the one or more ware in a rinse step with water or an aqueous rinse solution.

The methods further relate to methods of removing a soil from a ware, comprising a) optionally presoaking one or more ware to degrade the soil on the surface of the ware; b) optionally washing the one or more ware to remove the soil; and c) optionally rinsing the one or more ware.

In an embodiment, the methods are conducted at a temperature range of from about 100° F. to about 180° F. In a further embodiment, the method is conducted at a temperature of from about 100° F. to about 200° F. In an aspect, the rinse step does not result in precipitation on the treated ware.

Any suitable concentration of the compositions may be used. For example, the composition may be provided in a concentration of between about 0.5 ppm to about 100 ppm, between about 1 ppm to about 50 ppm, or between about 4 ppm to about 20 ppm, inclusive of all integers within these ranges.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

The microbial efficacy of the multipurpose disinfecting and sanitizing composition was evaluated for food contact applications at low concentrations of active and under a variety of pH conditions. Efficacy was evaluated using a use dilution test. The AOAC Use Dilution test is a method of testing the efficacy of disinfectants. It provides the standard for evaluating liquid and dilutable liquid disinfectants for surfaces. The Use Dilution test is a “high-level” test for disinfectants, meaning that an antimicrobial composition must have substantial microbiocidal efficacy in a relatively short time frame to pass the test. Most existing disinfecting/sanitizing compositions are evaluated using the Germicidal Spray test, which evaluates the efficacy of liquid disinfectants on non-porous, hard, surfaces. However, the Germicidal Spray test is subject to variability (due to ambiguity in the required method), requires efficacy at an overall lower water hardness threshold, sets a lower antimicrobial standard required for a composition to “pass.” Beneficially, the compositions described herein were evaluated using the more stringent Use Dilution test.

To complete the test, a cylinder of stainless steel was contacted with a culture of either *S. aureus* or *P. aeruginosa* together with 5% food soil. The cylinder was allowed to dry and was then contacted with solutions of antimicrobial composition at various concentrations for ten minutes. Bacterial survival and kill were subsequently ascertained. A control composition containing an antimicrobial quaternary ammonium compound (one or more of ADBAC, ADEBAC, and DAC) was compared to a composition comprising the same quaternary ammonium compound together with an acid (an organic acid, i.e., acetic acid).

The control composition had a pH of about 8 whereas the quat+acid composition had a pH of less than about 4. The concentration of the composition ranged from 300 ppm to 400 ppm quaternary ammonium. The compositions evaluated and results thereof are shown in Table 5 below and in FIG. 1.

TABLE 5

| Composition | pH | Product Diluent | Test Organisms | Soil | Contact Time (min) | Pass/ Fail | Quat Concentration |
|---|---|---|---|---|---|---|---|
| Acid Quat | 3.87 | 500 ppm hard water | *S. aureus* | 5% FBS | 10 | Fail | 300 ppm |
| Acid Quat | 3.87 | 500 ppm hard water | *P. aeruginosa* | 5% FBS | 10 | Pass | 300 ppm |
| Quat Control | 8.04 | 500 ppm hard water | *P. aeruginosa* | 5% FBS | 10 | Fail | 300 ppm |
| Quat Control | 8.02 | 400 ppm hard water | *S. aureus* | 5% FBS | 10 | Fail | 400 ppm |
| Acid Quat | 3.72 | 400 ppm hard water | *S. aureus* | 5% FBS | 10 | Pass | 400 ppm |

As shown in Table 5 and FIG. 1, the quaternary ammonium compound together with an acid as part of a composition with a pH of below 4 provided superior micro efficacy on a spectrum of microorganisms. Significantly, the quat+acid compositions provided superior antimicrobial efficacy even at very low concentrations of the quaternary ammonium compound—specifically as low as 300 ppm or 400 ppm The embodiments being thus described, it will be obvious that the same may be varied in many ways. Such variations are not to be regarded as a departure from the spirit and scope of the disclosure and all such modifications are intended to be included within the scope of the following claims.

What is claimed is:

1. A ready-to-use, food contact approved, acid sanitizing and cleaning composition comprising:

A) a food contact approved amount of an antimicrobial quaternary ammonium compound, wherein the food contact approved amount is between about 300 ppm to about 400 ppm and wherein the antimicrobial quaternary ammonium compound has the formula 1:

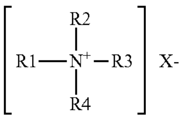

wherein $R_1$-$R_4$ are each one of an alkyl group having a $C_1$-$C_{16}$ chain length, a benzyl group, an alkyl benzyl group, or a combination thereof, and wherein X— is an anionic counterion;

B) between about 100 ppm to about 500 ppm of an acid source; and

C) a sheeting agent comprising an alcohol ethoxylate produced by ethoxylation of linear or branched aliphatic alcohols having a structure represented by the Formula: R—O—($CH_2CH_2O$) n-H wherein R is a ($C_1$-$C_{12}$) alkyl group and n is an integer in the range of 10 to 50; wherein i) the composition has a pH of ≤about 4;

ii) the antimicrobial quaternary ammonium provides no rinse disinfection at a temperature below about 120° F.; and iii) the composition is free of anionic surfactants.

2. The composition of claim 1, wherein the acid source is an organic acid.

3. The composition of claim 2, wherein the organic acid is a carboxylic acid, a polycarboxylic acid, or a combination thereof.

4. The composition of claim 1, wherein in formula 1 the alkyl group is a $C_1$-$C_4$ chain and/or a $C_8$-$C_{12}$ chain, and wherein the benzyl or alkyl benzyl group is a methyl benzyl and/or ethyl benzyl group, and wherein the X-anionic counterion is a halide, methyl sulfate, carbonate, bicarbonate, or a combination thereof.

5. The composition of claim 1, wherein the quaternary ammonium compound is selected from the group consisting of an alkyl dimethyl benzyl ammonium chloride, alkyl dimethyl ethyl benzyl ammonium chloride, a dialkyl dimethyl ammonium chloride, octyl decyl dimethyl ammonium chloride, dioctyl dimethyl ammonium chloride, didecyl dimethyl ammonium chloride, didecyl dimethyl ammonium carbonate, didecyl dimethyl ammonium bicarbonate, or a combination thereof.

6. The composition of claim 5, wherein the quaternary ammonium compound is octyl decyl dimethyl ammonium chloride, dioctyl dimethyl ammonium chloride, didecyl dimethyl ammonium chloride, or a combination thereof.

7. The composition of claim 1, wherein the composition is free of oxidizing agents and additional antimicrobial agents that are not quaternary ammonium compounds.

8. A method of cleaning a food contact surface comprising contacting a food contact surface with a ready-to-use, food contact approved, acid sanitizing and cleaning composition comprising:

A) a food contact approved amount of an antimicrobial quaternary ammonium compound, wherein the food contact approved amount is between about 300 ppm to about 400 ppm and wherein the antimicrobial quaternary ammonium compound has the formula 1:

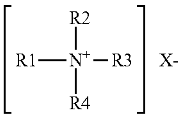

wherein $R_1$-$R_4$ are each one of an alkyl group having a $C_1$-$C_{16}$ chain length, a benzyl group, an alkyl benzyl group, or a combination thereof, and wherein X— is an anionic counterion;

B) between about 100 ppm to about 500 ppm of an acid source; and

C) a sheeting agent comprising an alcohol ethoxylate produced by ethoxylation of linear or branched aliphatic alcohols having a structure represented by the Formula: R—O—($CH_2CH_2O$) n-H wherein R is a ($C_1$-$C_{12}$) alkyl group and n is an integer in the range of 10 to 50; wherein i) the composition has a pH of ≤about 4;

ii) the antimicrobial quaternary ammonium provides no rinse disinfection at a temperature below about 120° F.; and iii) the composition is free of anionic surfactants.

9. The method of claim 8, wherein the food contact surface is a ware, a food processing surface, a food product, or a combination thereof.

10. The method of claim 9, wherein the food processing surface is a table, sink, cutting board, food packaging material, aseptic packaging material, or a combination thereof; and wherein the ware is a utensil, plate, cup, glass, mug, bowl, or a combination thereof.

11. The method of claim 9, wherein the food product is meat, seafood, produce, eggs, plants, or a combination thereof.

12. The method of claim 8, wherein the contacting occurs by spraying, dipping, soaking, immersing or wiping food contact surface.

13. A ready-to-use, food contact approved, acid sanitizing and disinfecting unit dose tablet comprising:

A) a food contact approved amount of an antimicrobial quaternary ammonium compound, wherein the food contact approved amount is between about 300 ppm to about 400 ppm and wherein the antimicrobial quaternary ammonium compound has the formula 1:

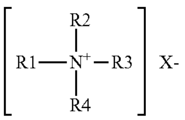

wherein $R_1$-$R_4$ are each one of an alkyl group having a $C_1$-$C_{16}$ chain length, a benzyl group, an alkyl benzyl group, or a combination thereof, and wherein X— is an anionic counterion;

B) between about 100 ppm to about 500 ppm of an acid source; and

C) a sheeting agent comprising an alcohol ethoxylate produced by ethoxylation of linear or branched aliphatic alcohols having a structure represented by the Formula: R—O—($CH_2CH_2O$) n-H wherein R is a ($C_1$-$C_{12}$) alkyl group and n is an integer in the range of 10 to 50; and D) optionally a dissolution aid; wherein i) the antimicrobial quaternary ammonium provides no rinse disinfection at a temperature below about 120° F.; and ii) the composition is free of anionic surfactants.

14. The tablet of claim 13, wherein the dissolution aid comprises potassium carbonate, potassium bicarbonate, sodium carbonate, sodium bicarbonate, calcium carbonate, or a combination thereof.

15. The tablet of claim 13, wherein the quaternary ammonium compound is selected from the group consisting of an alkyl dimethyl benzyl ammonium chloride, alkyl dimethyl ethyl benzyl ammonium chloride, a dialkyl dimethyl ammonium chloride, octyl decyl dimethyl ammonium chloride, dioctyl dimethyl ammonium chloride, didecyl dimethyl ammonium chloride, didecyl dimethyl ammonium carbonate, didecyl dimethyl ammonium bicarbonate, or a combination thereof; and wherein the acid source is a carboxylic acid, a polycarboxylic acid, or a combination thereof.

* * * * *